United States Patent
Nonhoff et al.

[11] Patent Number: 6,152,240
[45] Date of Patent: *Nov. 28, 2000

[54] ADJUSTABLE-WIDTH ATTACHMENT FOR AGRICULTURAL MACHINES

[75] Inventors: Ansgar Nonhoff, Wallerfangen; Egbert Scholz, Rheda-Wiedenbrück, both of Germany

[73] Assignee: Usines Claas France, St. Remy-Woippy, France

[*] Notice: This patent issued on a continued prosecution application filed under 37 CFR 1.53(d), and is subject to the twenty year patent term provisions of 35 U.S.C. 154(a)(2).

[21] Appl. No.: 09/120,066

[22] Filed: Jul. 21, 1998

[30] Foreign Application Priority Data

Jul. 23, 1997 [DE] Germany ............... 297 13 081 U

[51] Int. Cl.$^7$ .................................... A01B 51/00
[52] U.S. Cl. ..................... 172/311; 172/669; 56/228
[58] Field of Search ............... 172/310, 311, 172/396, 326, 327, 328, 354, 388, 421, 669, 776, 395, 228, 285, 397; 56/228, 385; 182/207; 280/43.16, 86, 86.5, 767, 763.1, 414.5; 180/208, 209

[56] References Cited

U.S. PATENT DOCUMENTS

| | | | |
|---|---|---|---|
| 200,295 | 2/1878 | Herbert | 172/396 |
| 1,054,483 | 2/1913 | Akers | 172/663 |
| 1,760,001 | 5/1930 | Reynolds | 172/395 |
| 2,833,105 | 5/1958 | Naery | 56/228 |
| 3,228,484 | 1/1966 | Arnold et al. | 172/400 |
| 3,583,495 | 6/1971 | Cantral et al. | 172/316 |
| 3,612,186 | 10/1971 | Fueslein | 172/421 |
| 3,735,572 | 5/1973 | Kasberger | 56/16.2 |
| 4,253,528 | 3/1981 | Sullivan et al. | 172/386 |
| 4,286,672 | 9/1981 | Forsyth et al. | 172/311 |
| 4,487,267 | 12/1984 | Friggstad | 172/310 |
| 4,555,897 | 12/1985 | Degelman | 56/228 |
| 4,831,814 | 5/1989 | Frisk et al. | 56/181 |
| 4,840,020 | 6/1989 | Oka | 172/395 |
| 5,054,560 | 10/1991 | Foley et al. | 172/248 |
| 5,191,942 | 3/1993 | Bussiere | 172/286 |
| 5,253,717 | 10/1993 | Roush et al. | 172/311 |
| 5,562,167 | 10/1996 | Honey | 172/386 |
| 5,664,796 | 9/1997 | Huyzers | 280/400 |

FOREIGN PATENT DOCUMENTS

| | | | |
|---|---|---|---|
| 2644029 | 9/1990 | France | 172/311 |
| 71 06 772 | 2/1971 | Germany . | |
| 91 02 354 U1 | 2/1991 | Germany | A01B 63/16 |
| 43 04 930 A1 | 2/1993 | Germany | A01B 73/02 |
| 1393330 | 5/1988 | U.S.S.R. | 172/311 |
| 2 097 2332 | 4/1981 | United Kingdom | A01B 63/02 |

Primary Examiner—Robert E. Pezzuto
Assistant Examiner—Nathan Mammen
Attorney, Agent, or Firm—Husch & Eppenberger, LLC; Robert E. Muir; Dutro E. Campbell, II

[57] ABSTRACT

Agricultural machine are generally equipped attachments, such as pick-up drums or cutting attachments. Generally, the width of the attachment is greater than that of the main machine or tractor. Because the agricultural machines travel in road traffic, the permitted width of the attachment must not exceed the legally prescribed width of a road vehicle. These attachments usually have supporting wheels for supporting the attachment on the ground. The supporting wheels are mounted and rotate upon carrying arms. Also, the attachment's height above the ground is adjustable by an adjusting device. The attachment provides for positioning the supporting wheels such that the width of the attachment is within the limits permitted in road traffic when traveling in public road traffic, although during working use, the width of the attachment is beyond the width permitted on the road.

30 Claims, 2 Drawing Sheets

ADJUSTABLE-WIDTH ATTACHMENT FOR AGRICULTURAL MACHINES

BACKGROUND OF THE INVENTION

The present invention relates generally to agricultural machinery, and more particularly to an attachment equipped with supporting wheels which are rotatably mounted on carrying a rms.

Generally, the width of the attachment is greater than that of the main machine or tractor. However, because agricultural machines often travel in road traffic, the permissible width of the attachment must not exceed the legally prescribed width of a vehicle. With the exception of those machines in which the attachment can be dismounted for road traffic, the laterally arranged supporting wheels limit the permissible width of the attachment.

It is an object of the invention to provide a structurally simple design for an attachment for agricultural machinery such that the total width of the attachment in working use is greater than the permitted width in road traffic, but includes a means for re-positioning the supporting wheels such that when traveling in public road traffic, the permitted width is not exceeded.

SUMMARY OF THE INVENTION

The objective of the present invention is achieved by mounting each carrying arm upon at least one double pivot bearing, which comprises a first stationary and a horizontal journal, and a second bearing pin which pivots about the center longitudinal axis of the first journal and upon which the carrying arm is mounted and rotates.

The mounting of the carrying arms according to the invention makes it possible to pivot the carrying arms initially about the longitudinal axis of the second bearing pin, although this bearing pin is still fixed. Thus, for example, by a pivot movement of 180 degrees, the respective supporting wheel can be pivoted into a position behind the attachment so that the supporting wheel no longer projects from the side wall of the attachment. Furthermore, because the supporting wheel must have no contact with the ground when traveling outside of working use, the bearing pin can also be pivoted about the longitudinal axis of the stationary journal, keeping each supporting wheel a distance from the ground. Due to this simple measure, the operating width of the attachment can be increased, thereby increasing the capacity of the agricultural machine as well.

The pivotal connection between the bearing pin and the stationary journal can be achieved by rigidly connecting the bearing pin receiving the carrying arm to a bearing bush mounted pivotally on the stationary journal. Consequently, only four ordinary components are needed for the double pivot bearing, as each carrying arm is attached in a preferred manner to a bearing sleeve mounted and rotating upon the bearing pin. Due to this construction each carrying arm can initially be pivoted into a position behind the attachment and then lifted.

A preferred embodiment also provides that each carrying arm's end facing away from the bearing sleeve comprises an extension arm upon which a fork is mounted and rotates. In addition, the supporting wheels are inserted In each fork. As a result, each supporting wheel is laterally adjacent to the carrying arm, so that upon pivoting behind the attachment, the distance between the two positions is significant enough so that the supporting wheel no longer projects from the side wall of the attachment. Each carrying arm is adjusted in height relative to the ground by means of a locking device. This locking device is particularly simple if a locking plate is advantageously provided with a row of holes arranged on each carrying arm such that the holes, in both the operative and the inoperative positions, can be brought into engagement with a stationary plug of the attachment. Thus, an additional plug for locking the carrying arm in the inoperative position is eliminated. However, a suitable design of the carrying arm and an appropriate design and arrangement of the locking plate are necessary.

The design of the attachment is determined according to its type of use and could be a pick-up drum or a cutting attachment, for example. In the case of the supporting wheels, a distinction is made between pushed and pulled constructions, depending on the position of the pivotal suspension in relation to the main functional part of the attachment. The attachment's height above the ground is adjustable by means of an adjusting device.

BRIEF DESCRIPTION OF THE DRAWINGS

With the aid of the attached drawings the invention is described in more detail. They show.

DETAILED DESCRIPTION

Figure 1:
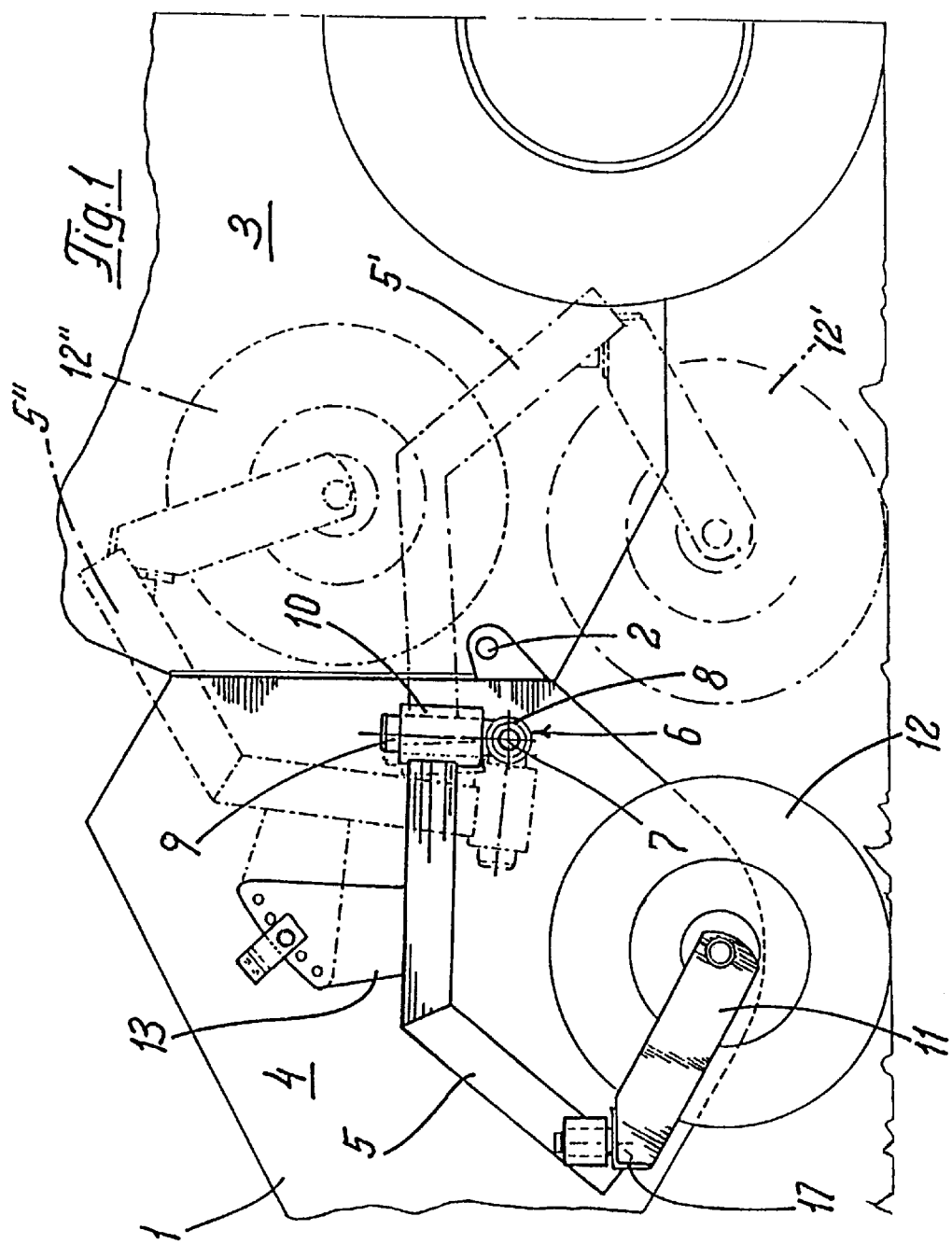
FIG. 1 is a side view schematically showing the attachment coupled to an agricultural machine.
Figure 2:
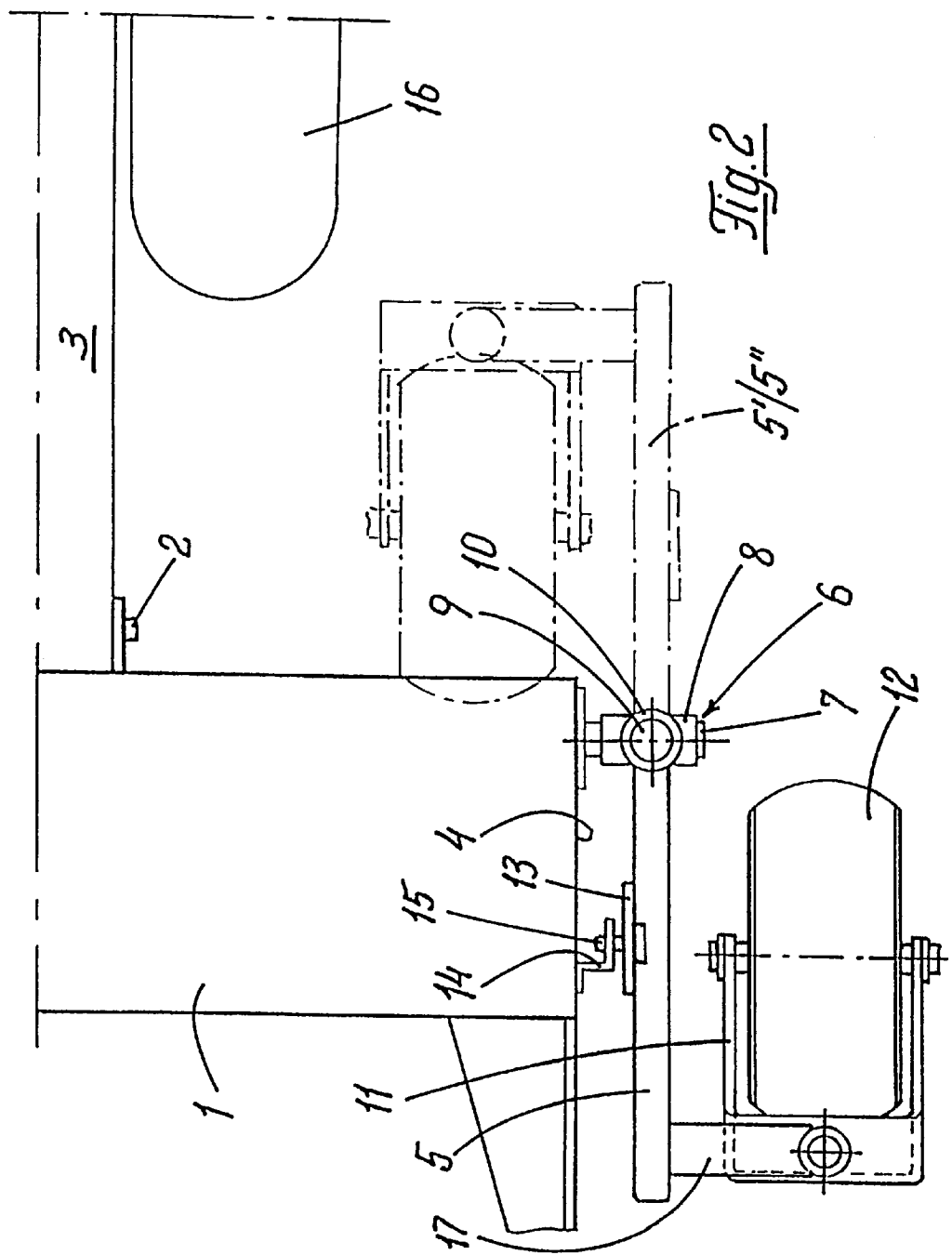
FIG. 2 is one-half of a top view of the apparatus shown to FIG. 1.

The attachment 1 shown in the drawings may be any convenient attachment for an agricultural machine 3. It is pivotally linked by a pivot shaft 2 to the main machine 3, also not described in more detail. In a preferred embodiment, the attachment 1 could for example be equipped with a cutter bar or a pick-up drum. Outer carrying arms 5 are arranged laterally adjacent to the side walls 4 of the attachment 1 by means of double pivot bearings 6 on the side walls 4. Each double pivot bearing 6 essentially consists of four components, namely a horizontal stationary journal 7 fixed to the associated side wall 4, a bearing bush 8 mounted and rotating upon stationary journal 7 and rigidly connected to a bearing pin 9 transverse to the journal 7 and a bearing sleeve 10 mounted and rotating upon the bearing pin 9. The carrying arm 5 is welded onto the bearing sleeve 10. Instead of a double pivot bearing 6, at least two individual pivot bearings could be used. A fork 11 is pivotally mounted upon the opposite end of the angled carrying arm 5 by an extension arm 17. The fork 11 is laterally offset by means of a pin and a sleeve. A rotating supporting wheel 12 is inserted in this fork 11 by means of an axle. The height of each supporting wheel 12 may be adjusted relative to the ground by means of a locking device. For this purpose a locking plate 13 with a row of holes is rigidly attached to the carrying arm 5. Z-shaped profiles are attached to the side walls 4 of the attachment 1. The connection is made between the z-shaped profile 14 and the individual holes in the locking plate 13 by means of a plug 15. Each plug 15 can have a bolt-like construction. The locking device can also be conveniently fitted in such a way that pivoting of the carrying arms 5 is prevented as well. The main machine 3 is equipped with running wheels 16. FIG. 2 shows clearly that the width of the attachment 1 is much greater than the width of the main machine 3. In FIGS. 1 and 2 the unbroken lines show the respective working position of the respective outside supporting wheel 12. After release of the plug 15, each carrying arm 5 can be pivoted about a vertical axis, defined by the bearing pin 9, through an angle of 180 degrees. These positions are marked by the reference number 5' for the carrying arms and by the reference number 12' for the supporting rollers. Then pivoting of the horizontal axis occurs as a result of the position of the journal 7. These positions are marked in FIG. 1 by the reference numbers 5" for the carrying arms and 12" for the supporting wheels. It follows that the position pivoted inwards through 180 degrees and the raised position, yield only a very small difference in distance from the running wheels 16 of the main machine 3. It further follows, as shown in FIG. 2, that the width of the whole attachment 1 in a driving position can be reduced substantially by pivoting the supporting wheels 12 inwards, so that the attachment 1 can be substantially widened.

The invention is applicable to other embodiments other than the embodiment shown in FIGS. 1 and 2. The essential element is the pivoting of the supporting wheels 12 into a free space behind or in front of the attachment 1 and subsequent pivoting about an axis perpendicular thereto in order to bring the supporting wheels 12 out of contact with the ground.

FIG. 2 shows an extension arm 17, upon which the fork 11 is mounted and rotates, attached to the end of the carrying arm 5 opposite the bearing sleeve 10. This extension arm 17 extends outwardly so that in the inwardly pivoted position of the carrying arm 5, the running wheel 12 projects towards the center relative to the side wall 4 of the attachment 1.

Other objects, features and advantages will be apparent to those skilled in the art. While a preferred embodiment of the present invention has been illustrated and described, this has been by way of illustration and the invention should not be limited except as required by the scope of the appended claims.

We claim:

1. In a moveable support for an attachment for an agricultural machine, the moveable support having a supporting wheel which is rotatably mounted on a carrying arm, the improvement comprising:
    pivot bearing means on the attachment and upon which the carrying arm is pivotally mounted for pivoting around two axes which are perpendicular to each other, the pivot bearing means having a substantially horizontal and stationary journal a bearing pin having a longitudinal axis generally perpendicular to a center longitudinal axis of the journal, a means for pivotally mounting the bearing pin about the center longitudinal axis of the journal, the longitudinal axis of the bearing pin substantially intersecting the center longitudinal axis of the journal at the means for pivotally mounting the bearing pin, means for pivotally mounting the carrying arm on the bearing pin, the pivot bearing means being so constructed and arranged that the supporting wheel is first pivoted about one of the axes into a free space in proximity to the attachment and subsequently pivoted about the other axis which is perpendicular to said one axis to move the supporting wheel to a position out of contact with the ground.

2. A moveable support according to claim 1, wherein the bearing pin receiving the carrying arm is directly connected to a bearing bush.

3. A moveable support according to claim 2, wherein said bearing bush is mounted pivotally on the journal.

4. A moveable support according to claim 1, wherein the carrying arm is attached to a bearing sleeve which is mounted upon and rotates on the bearing pin.

5. A moveable support according to claim 4, wherein an end on the carrying arm faces away from the bearing sleeve and comprises an extension arm upon which a fork is mounted and can be rotated and in which the supporting wheel is inserted.

6. A moveable support according to claim 1, including a locking plate having a row of holes arranged on the carrying arm to form a locking device.

7. A moveable support according to claim 6, wherein the locking plate is arranged in such a way that the row of holes, in both operative and inoperative positions, is so constructed and arranged to be brought into engagement with a plurality of stationary plugs connected to the attachment.

8. In a moveable support for an attachment for an agricultural machine, which is equipped with supporting wheels for support on the ground and which are rotatably mounted on carrying arms, the improvement comprising:
    means for rotatably and pivotably mounting each carrying arm including a double pivot bearing which comprises at least one stationary as well as horizontal journal, a bearing bush pivotably mounted on the journal, a bearing pin directly connected to the bearing bush and pivotable about a center longitudinal axis of the journal, a longitudinal axis of the bearing pin being generally perpendicular to the center longitudinal axis of the journal, means for pivotably mounting the carrying arm on the bearing pin, said double pivot bearing being pivotable around two axes which are perpendicular to each other, the attachment being so constructed and arranged that the supporting wheels are first pivoted using the double pivot bearing into a free space in proximity with the attachment and subsequently pivoted using the double pivot bearing about the axis perpendicular thereto in order to bring the supporting wheels out of contact with a portion of ground.

9. A movable support in accordance with claim 1 wherein the carrying arms are pivotable about a vertical axis through an angle of 180 degrees.

10. A movable support in accordance with claim 1 further including means for locking the supporting wheel in position.

11. A movable support in accordance with claim 10 wherein the means for locking the supporting wheel in position is adjustable with respect to height of the supporting wheel from the ground.

12. A movable support in accordance with claim 11 wherein the means for locking the supporting wheel includes:
    a side wall on the attachment
    a locking plate having a plurality of holes rigidly attached to the carrying arm;
    a plurality of Z-shaped profiles on the side wall; and
    a plug connecting one of the Z-shaped profiles and one of the holes.

13. A movable support in accordance with claim 12 wherein the means for locking the supporting wheel is fitted to prevent the carrying arm from pivoting.

14. A moveable support according to claim 8 wherein the carrying arms are pivotable about a vertical axis through an angle of 180 degrees.

15. A movable support in accordance with claim 9 further including means for locking the supporting wheel in position.

16. A movable support in accordance with claim 15 wherein the means for locking the supporting wheel in position is adjustable with respect to height of the supporting wheel from the ground.

17. A movable support in accordance with claim 16 wherein the means for locking the supporting wheel includes:

a side wall on the attachment a locking plate having a plurality of holes rigidly attached to the carrying arm;

a plurality of Z-shaped profiles on the side wall; and a plug connecting one of the Z-shaped profiles and one of the holes.

18. A movable support in accordance with claim 17 wherein the means for locking the supporting wheel is fitted to prevent the carrying arm from pivoting.

19. A moveable support for an attachment for an agricultural machine, the moveable support having a supporting wheel which engages the ground in an operative position and is rotatably mounted on a carrying arm, the improvement comprising:

pivot bearing means at a lateral end of the attachment and upon which the carrying arm is pivotally mounted for pivoting around two axes which are perpendicular to each other, the pivot bearing means having a substantially horizontal and stationary journal a bearing bush pivotally mounted on the journal, a bearing pin directly connected to the bearing bush and pivotal about a center longitudinal axis of the journal, a longitudinal axis of the bearing pin being generally perpendicular to the center longitudinal axis of the journal, means for pivotally mounting the carrying arm on the bearing pin, the pivot bearing means being so constructed and arranged that the supporting wheels may be first pivoted about one of the axes from the operative position into a free space in proximity to the attachment and subsequently pivoted about the other axis to a position inwardly of the lateral end of the attachment.

20. A moveable support in accordance with claim 19 wherein the carrying arm is pivotable about a vertical axis through an angle of 180 degrees.

21. A movable support in accordance with claim 19 further including means for locking the supporting wheel in position.

22. A movable support in accordance with claim 21 wherein the means for locking the supporting wheel in position is adjustable with respect to height of the supporting wheel from the ground.

23. A movable support in accordance with claim 22 wherein the means for locking the supporting wheel includes:

a side wall on the attachment a locking plate having a plurality of holes rigidly attached to the carrying arm;

a plurality of Z-shaped profiles on the side wall; and a plug connecting one of the Z-shaped profiles and one of the holes.

24. A movable support in accordance with claim 23 wherein the means for locking the supporting wheel is fitted to prevent the carrying arm from pivoting.

25. A moveable support for an attachment for a mobile machine including:

a carrying arm;

a supporting wheel rotatably mounted on the carrying arm;

means for mounting the supporting wheel for movement between a ground-engaging position at an outside end of the attachment, and a moved position inwardly of the outside end of the attachment; and the mounting means including a device on the attachment for pivoting the carrying arm around a first axis and a second axis, the first and second axes being perpendicular to each other, the device having a stationary and horizontal journal a bearing bush pivotally mounted on the journal, a bearing pin directly connected to the bearing bush and pivotal about a center longitudinal axis of the journal, a longitudinal axis of the bearing pin being generally perpendicular to the center longitudinal axis of the journal, means for pivotally mounting the carrying arm on the bearing pin, the device being so constructed and arranged for movement of the supporting wheel from the ground engaging position to the moved position by pivoting the carrying arms about the first axis and subsequently pivoting the carrying arms about the second axis.

26. A moveable support in accordance with claim 25 wherein the carrying arm is pivotable about a vertical axis through an angle of 180 degrees.

27. A movable support in accordance with claim 25 further including means for locking the supporting wheel in position.

28. A movable support in accordance with claim 27 wherein the means for locking the supporting wheel in position is adjustable with respect to height of the supporting wheel from the ground.

29. A movable support in accordance with claim 28 wherein the means for locking the supporting wheel includes:

a side wall on the attachment a locking plate having a plurality of holes rigidly attached to the carrying arm;

a plurality of Z-shaped profiles on the side wall; and a plug connecting one of the Z-shaped profiles and one of the holes.

30. A movable support in accordance with claim 29 wherein the means for locking the supporting wheel is fitted to prevent the carrying arm from pivoting.

* * * * *